United States Patent
Mendes et al.

(10) Patent No.: US 11,960,629 B1
(45) Date of Patent: Apr. 16, 2024

(54) DETERMINING AN EXPOSURE RATING TO HELP PREVENT FRAUD RISK FROM USER DATA EXPOSURE

(71) Applicant: PrivacyHawk, Inc, Los Angeles, CA (US)

(72) Inventors: Aaron Mendes, San Diego, CA (US); Justin Wright, Los Angeles, CA (US)

(73) Assignee: PrivacyHawk, Inc., Los Angeles, CA (US)

( * ) Notice: Subject to any disclaimer, the term of this patent is extended or adjusted under 35 U.S.C. 154(b) by 0 days.

(21) Appl. No.: 18/482,171

(22) Filed: Oct. 6, 2023

(51) Int. Cl.
  *G06F 21/00* (2013.01)
  *G06F 21/62* (2013.01)

(52) U.S. Cl.
  CPC ................ *G06F 21/6263* (2013.01)

(58) Field of Classification Search
  CPC .................................................. G06F 21/6263
  See application file for complete search history.

(56) References Cited

U.S. PATENT DOCUMENTS

| | | | |
|---|---|---|---|
| 2016/0253710 A1* | 9/2016 | Publicover | H04W 4/21 705/14.66 |
| 2017/0032143 A1* | 2/2017 | Kong | G06F 21/6263 |
| 2019/0392064 A1* | 12/2019 | Swope | H04L 9/3239 |

\* cited by examiner

*Primary Examiner* — Ghazal B Shehni
(74) *Attorney, Agent, or Firm* — Muncy, Geissler, Olds & Lowe, P.C.

(57) ABSTRACT

Disclosed are techniques for providing an exposure rating. In an aspect, a processing system provides, to a user, an exposure rating to enable the user to visualize a level of online exposure of their personal information, wherein the exposure rating is determined based at least in part on an email score and a data broker score, wherein the email score is determined based at least in part on a number of a set of commercial email domains determined from a scan of an email account of the user, a number of a set of protected commercial email domains, and an email portion of the exposure rating, and wherein the data broker score is determined based at least in part on a number of a set of known data brokers, a number of the set of protected data brokers, and a data broker portion of the exposure rating.

19 Claims, 9 Drawing Sheets

DETERMINING AN EXPOSURE RATING TO HELP PREVENT FRAUD RISK FROM USER DATA EXPOSURE

BACKGROUND OF THE DISCLOSURE

1. Field of the Disclosure

Aspects of the disclosure relate generally to ensuring the privacy of a user's personal information, and more specifically, to providing an exposure rating for the user to enable the user to visualize a level of online exposure of the personal information of the user.

2. Description of the Related Art

There are two types of companies that may store a user's personal information: (1) "direct companies," which are companies with which the user has a direct relationship, such as retailers from which the user has purchased a product, and (2) "data brokers" (also referred to as "data harvesters"), such as marketing companies with which the user does not have a direct relationship. With the ever-increasing use of the internet to interact with customers and/or clients, direct companies are collecting and storing more personal information about their customers and clients than ever before. Sometimes these companies may fall victim to a data breach in which sensitive personal information of their customers is leaked to hackers and scammers who can use that data to commit fraud, such as identity theft and phishing scams.

Data brokers gather, share, sell, or otherwise exploit users' personal information without the users' knowledge or consent. Spammers, scammers, telemarketers, and/or the like can purchase this user data to spam, scam, make unsolicited calls to, and/or send "junk" mail to the respective users. Additionally or alternatively, identity thieves and/or hackers can use this personal information to impersonate users and make purchases with their credit cards, take over their bank accounts, and/or the like.

While new laws have been enacted to help individuals remove these vulnerabilities, or at least to allow users to opt-out from such collection, sharing, and exposure, it is nearly impossible for individuals to take advantage of their privacy rights due to complicated opt-out processes and the sheer number of companies exposing and exploiting their personal information.

Further, for users that have begun opting-out of having their personal information exposed online, there is no way for the user to determine their current level of data exposure online. As such, a user may not take appropriate action, such as sending additional opt-out requests, applying credit freezes to their credit accounts, and the like.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, an apparatus includes one or more memories; one or more transceivers; and one or more processors communicatively coupled to the one or more memories and the one or more transceivers, the one or more processors, either alone or in combination, configured to: obtain, via the one or more transceivers, a number of a set of protected commercial email domains, wherein the set of protected commercial email domains comprises commercial email domains to which opt-out requests for an email account of a user have been transmitted and from which successful opt-out responses have been received, and wherein the set of protected commercial email domains is a subset of a set of commercial email domains identified in the email account of the user and selected for opt-out; obtain, via the one or more transceivers, a number of a set of protected data brokers, wherein the set of protected data brokers comprises data brokers that are determined to not store personal information of the user, and wherein the set of protected data brokers is determined based on a scan of websites associated with a set of known data brokers for the personal information of the user; and provide, to the user, an exposure rating for the user to enable the user to visualize a level of online exposure of the personal information of the user, wherein the exposure rating is determined based at least in part on an email score and a data broker score, wherein the email score is determined based at least in part on a number of the set of commercial email domains, the number of the set of protected commercial email domains, and the email portion of the exposure rating, and wherein the data broker score is determined based at least in part on a number of the set of known data brokers, the number of the set of protected data brokers, and the data broker portion of the exposure rating.

In an aspect, an apparatus includes one or more memories; one or more transceivers; and one or more processors communicatively coupled to the one or more memories and the one or more transceivers, the one or more processors, either alone or in combination, configured to: obtain, via the one or more transceivers, a number of a set of protected commercial email domains, wherein the set of protected commercial email domains comprises commercial email domains to which opt-out requests for an email account of a user have been transmitted and from which successful opt-out responses have been received, and wherein the set of protected commercial email domains is a subset of a set of commercial email domains identified in the email account of the user and selected for opt-out; obtain, via the one or more transceivers, a number of a set of protected data broker records, wherein the set of protected data broker records comprises records associated with the user that have been removed by respective data brokers of a set of known data brokers in response to opt-out requests transmitted to the set of known data brokers, wherein the set of protected data broker records is a subset of a set of data broker records associated with the user that is determined based on a scan of websites associated with the set of known data brokers for the personal information of the user; and provide, to the user, an exposure rating for the user to enable the user to visualize a level of online exposure of the personal information of the user, wherein the exposure rating is determined based at least in part on an email score and a data broker score, wherein the email score is determined based at least in part on a number of the set of commercial email domains, the number of the set of protected commercial email domains, and the email portion of the exposure rating, and wherein the data broker score is determined based at least in part on a number of the set of data broker records, the number of the set of protected data broker records, and the data broker portion of the exposure rating.

In an aspect, a method performed by a processing system includes obtaining a number of a set of protected commercial email domains, wherein the set of protected commercial email domains comprises commercial email domains to which opt-out requests for an email account of a user have been transmitted and from which successful opt-out responses have been received, and wherein the set of protected commercial email domains is a subset of a set of commercial email domains identified in the email account of the user and selected for opt-out; obtaining a number of a set of protected data brokers, wherein the set of protected data brokers comprises data brokers that are determined to not store personal information of the user, and wherein the set of protected data brokers is determined based on a scan of websites associated with a set of known data brokers for the personal information of the user; and providing, to the user, an exposure rating for the user to enable the user to visualize a level of online exposure of the personal information of the user, wherein the exposure rating is determined based at least in part on an email score and a data broker score, wherein the email score is determined based at least in part on a number of the set of commercial email domains, the number of the set of protected commercial email domains, and the email portion of the exposure rating, and wherein the data broker score is determined based at least in part on a number of the set of known data brokers, the number of the set of protected data brokers, and the data broker portion of the exposure rating.

In an aspect, a method performed by a processing system includes obtaining a number of a set of protected commercial email domains, wherein the set of protected commercial email domains comprises commercial email domains to which opt-out requests for an email account of a user have been transmitted and from which successful opt-out responses have been received, and wherein the set of protected commercial email domains is a subset of a set of commercial email domains identified in the email account of the user and selected for opt-out; obtaining a number of a set of protected data broker records, wherein the set of protected data broker records comprises records associated with the user that have been removed by respective data brokers of a set of known data brokers in response to opt-out requests transmitted to the set of known data brokers, wherein the set of protected data broker records is a subset of a set of data broker records associated with the user that is determined based on a scan of websites associated with the set of known data brokers for the personal information of the user; and providing, to the user, an exposure rating for the user to enable the user to visualize a level of online exposure of the personal information of the user, wherein the exposure rating is determined based at least in part on an email score and a data broker score, wherein the email score is determined based at least in part on a number of the set of commercial email domains, the number of the set of protected commercial email domains, and the email portion of the exposure rating, and wherein the data broker score is determined based at least in part on a number of the set of data broker records, the number of the set of protected data broker records, and the data broker portion of the exposure rating.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
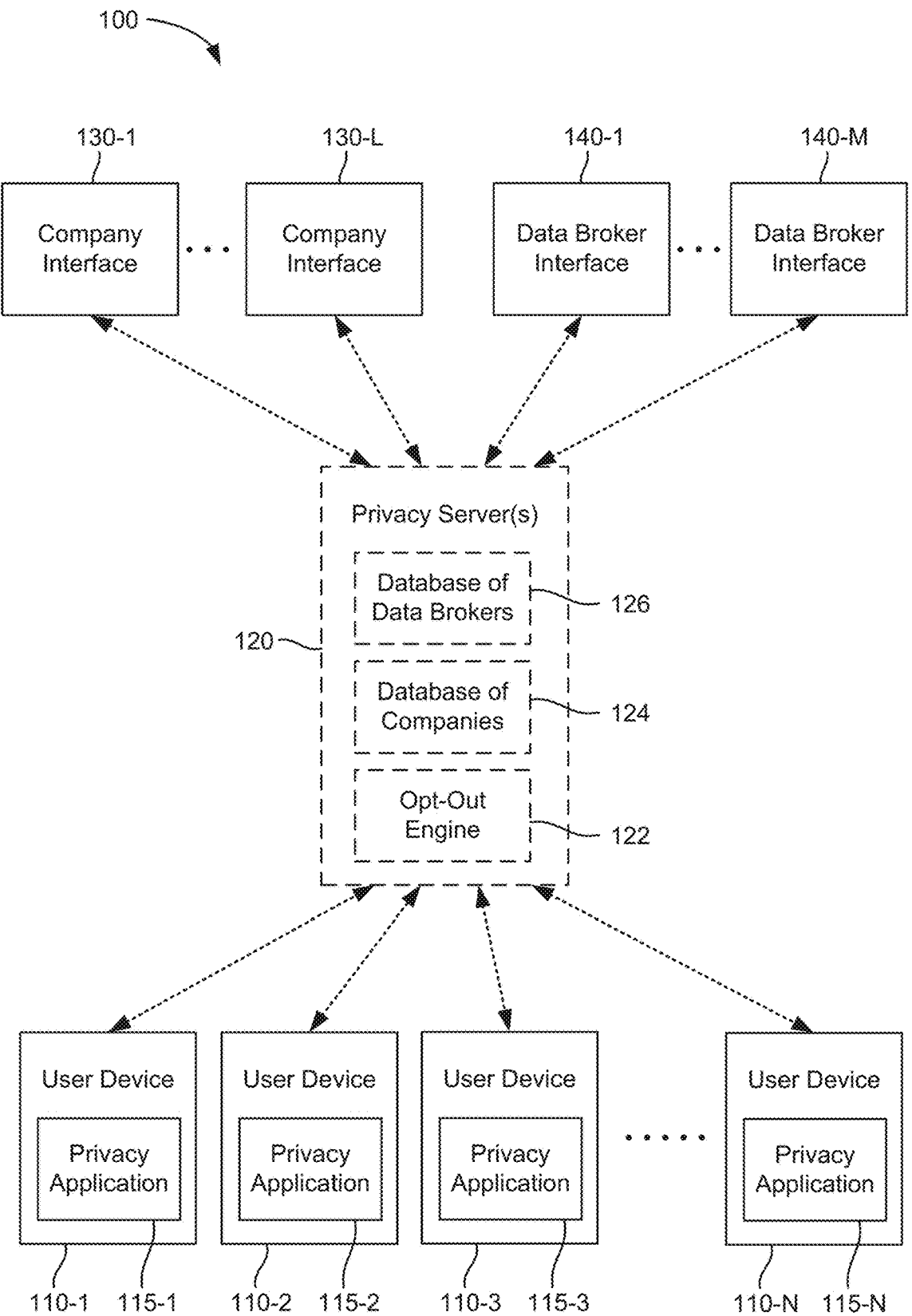
FIG. 1 illustrates an example system for implementing the opt-out techniques described herein.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs), digital signal processors (DSPs), microprocessors, etc.), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

There are two types of companies that may store a user's personal information: (1) "direct companies," which are companies with which the user has a direct relationship, such as retailers from which the user has purchased a product, and (2) "data brokers" (also referred to as "data harvesters"), such as marketing companies with which the user does not have a direct relationship. With the ever-increasing use of the internet to interact with customers and/or clients, direct companies are collecting and storing more personal information about their customers and clients than ever before. Sometimes these companies may fall victim to a data breach in which sensitive personal information of their customers is leaked to hackers and scammers who can use that data to commit fraud, such as identity theft and phishing scams.

Data brokers gather, share, sell, or otherwise exploit users' personal information without the users' knowledge or consent. Spammers, scammers, telemarketers, and/or the like can purchase this user data to spam, scam, make unsolicited calls to, and/or send "junk" mail to the respective users. Additionally or alternatively, identity thieves and/or hackers can use this personal information to impersonate users and make purchases with their credit cards, take over their bank accounts, and/or the like.

While new laws have been enacted to help individuals remove these vulnerabilities, or at least to allow users to opt-out from such collection, sharing, and exposure, it is nearly impossible for individuals to take advantage of their privacy rights due to complicated opt-out processes and the sheer number of companies exposing and exploiting their personal information (referred to as "first party data").

The present disclosure provides techniques for enabling a user to opt-out of having their personal information collected and shared without their permission. More specifically, the present disclosure provides techniques for opting-out from both direct companies and data brokers.

The techniques of the present disclosure related to the personal information stored and shared by direct companies will be described with reference to FIGS. 1 and 2. Specifically, FIG. 1 illustrates an example system 100 for implementing the opt-out techniques described herein, and FIG. 2 is an example signaling flow 200 illustrating the opt-out techniques related to direct companies described herein.

Figure 2:
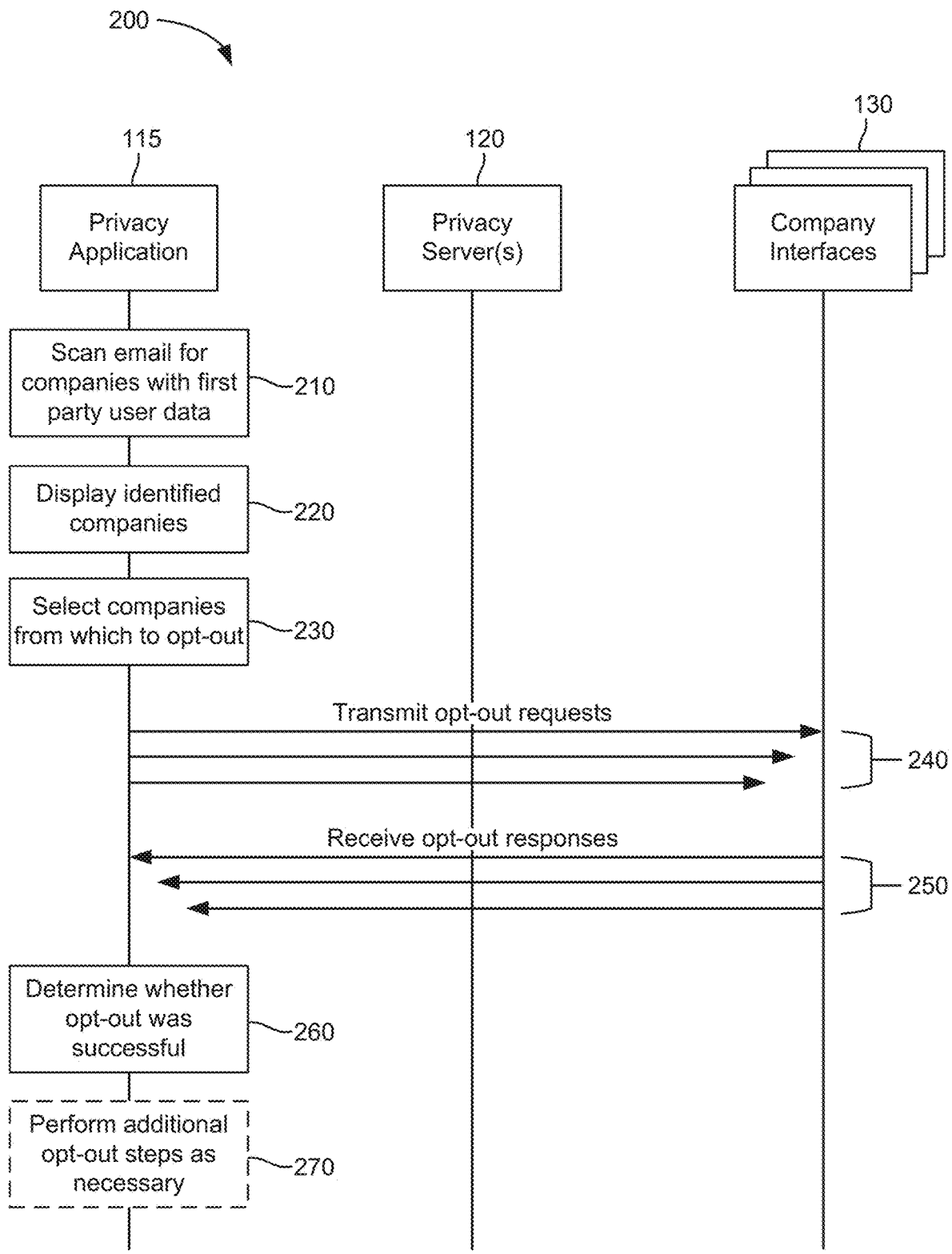
FIG. 2 illustrates an example signaling flow for the opt-out techniques related to direct companies described herein.

As shown in FIG. 1, a plurality N of user devices 110 (illustrated as user devices 110-1, 110-2, 110-3, . . . 110-N) each have a privacy application 115 installed thereon (illustrated as privacy applications 115-1, 115-2, 115-3, . . . 115-N). A user device 110 may be a smartphone, a tablet computer, a laptop computer, a desktop computer, or the like. The N user devices 110 may optionally be in communication with a privacy server 120 (or a group of distributed privacy servers 120). The privacy server(s) 120 implement an opt-out engine 122 and store a database of companies 124. The database of companies 124 may be distributed across one or more physical data repositories at one or more privacy servers 120 or remote from the privacy server(s) 120. The privacy server 120 is in communication with a plurality L of company interfaces 130 (illustrated as company interfaces 130-1 . . . 130-L) of companies that may store users' first party data. The company interfaces 130 may be the companies' Internet or other network interfaces (e.g., websites, webservers, etc.).

Most of the direct companies (and organizations) with a user's first party data are likely to be found in the user's email. Thus, at stage 210 of FIG. 2, a privacy application 115 (optionally in communication with the opt-out engine 122) installed on a user device 110 scans the user's email for companies that are likely to have the user's first party data. In some cases, this may be all the commercial email accounts/domains from which the user has ever received email. In some cases, this may be all the sender email accounts/domains that match a company in the database of companies 124. In this case, the privacy application 115 may securely provide a list of all commercial email accounts/domains found in the user's email to the opt-out engine 122, which may in turn compare that list to the database of companies 124. The opt-out engine 122 may then return to the privacy application 115 a list of companies in the database of companies 124 that match the list of commercial email accounts/domains received from the privacy application 115.

Based on the user's privacy preferences with respect to the user device 110 and/or email application, the user may need to grant the privacy application 115 permission to access the user's email application. In some cases, the user's email (or at least a portion of the user's email) may not be stored locally on the user device 110, but rather, on one or more remote email servers (not shown in FIG. 1 or 2). In those cases, the privacy application 115 may securely connect with the remote email server(s) to access the user's email.

Once the user's email has been scanned, at stage 220, the privacy application 115 displays a list of the identified companies to the user via the user interface of the user device 110. The privacy application 115 may display a select button by each entry in the list of companies and/or commercial email accounts identified at stage 210 to allow the user to select the corresponding company. The privacy application 115 may also recommend which companies to select. For example, the privacy application 115 may display a list of "Recommended" companies or highlight recommended companies within the list of identified companies. The recommendations may be based on information from the privacy server(s) 120.

At stage 230, the privacy application 115 selects the companies to which to send opt-out requests. The selection may be based on user input. For example, the user may select to opt-out of all identified companies, only recommended companies, only companies of a certain type (e.g., retailers, political organizations, etc.), or the like. The user may further indicate the type of opt-out desired, such as having all their first party data deleted, opting out of having their first party data shared with affiliates or other third parties, unsubscribing from promotional/marketing emails (often referred to as "spam"), requesting a copy of the data that the entity holds about the user ("right to know request"), or the like. Alternatively, the selection and type of opt-out may be selected automatically. For example, when initiating the email scan at stage 210, the user may set a preference to opt-out from allowing any company to share the user's personal information.

At stage 240, the privacy application 115 transmits opt-out requests to the selected companies (optionally via the privacy server 120/opt-out engine 122). Some companies handle opt-out requests by email (i.e., a user is expected to compose and send an opt-out request to the company by email) and other companies handle opt-out requests by webform (i.e., the user is expected to fill out an online form requesting the opt-out). An opt-out request is generally more effective if it comes directly from the user. Accordingly, for email-based opt-out requests, the privacy application 115 composes and sends emails requesting the types of opt-outs for the respective companies from the user's email account. For webform-based opt-outs, the privacy application 115 fills out and submits the applicable webform using any user data required by the webform (e.g., name, address, email, etc.).

At stage 250, the privacy application 115 receives responses to the opt-out requests sent at stage 240 (optionally via the privacy server 120/opt-out engine 122). The responses may be received immediately on submission of the opt-out request (which may occur in the case of a webform request) or at some later time (e.g., after the company has manually processed the opt-out request email or webform). The responses may indicate that the opt-out was successful (e.g., the company deleted and/or will not share/sell the user's personal information), that additional information or steps are necessary, that the user's data was not found (and therefore cannot be deleted), etc. If the opt-out response is not received immediately, the response will likely be received as an email at some later time.

At stage 260, based on the responses from the companies received at stage 250, the privacy application 115 determines whether the respective opt-out requests were successful or if more information/steps are needed. The privacy application 115 (optionally in communication with the opt-out engine 122) may use machine learning techniques to make this determination.

In greater detail, the types of opt-out procedures (e.g., email-based, webform-based) and the language of opt-out responses (e.g., successful, more steps needed, user data not found, etc.) can vary dramatically from company to company. While there are techniques to automate the task of sending opt-out requests, there is minimal, if any, automation of classifying the different types of opt-out responses. Rather, a user must manually review each opt-out response to determine if the opt-out was successful or if more information or steps are needed. Given that a single user may receive opt-out responses from hundreds, and possibly thousands, of companies, this is a significant burden to the user and a significant gap in the service provided by such an opt-out service provider. Applying machine learning to opt-out responses can allow these responses to be properly classified without user interaction, thereby dramatically improving the performance of the privacy application and the corresponding opt-out service.

In some cases, the machine learning model may be specifically trained to classify opt-out responses. For example, such a machine learning model may be trained on a large number (e.g., thousands) of full-text natural language opt-out responses that have been manually classified/labelled as particular types of opt-out responses (e.g., opt-out successful, user data successfully deleted, more user information needed, more steps needed, user data not found, etc.). That is, a training set of classified opt-out responses may be used as the input (i.e., features) to the machine learning model and the known classification types of the opt-out responses are used as the reference outputs (i.e., labels).

Alternatively, instead of using a specifically trained machine learning model, a natural language general artificial intelligence program could be used. For example, general artificial intelligence programs, such as generative pre-trained transformer (GPT) models, are being developed and commercialized. These general artificial intelligence programs have been trained to understand natural language and provide text outputs in response to their inputs. Referring to GPT models specifically, the input to a GPT model is referred to as a "prompt," and designing a prompt is essentially how a GPT model is programmed. A prompt, therefore, usually provides instructions and/or examples of how to successfully complete the task. GPT models can be used for a large variety of tasks, such as content or code generation, summarization, conversation, and creative writing.

Thus, in this case, instead of the machine learning model being trained on a specific data set of opt-out responses, the machine learning model may be a general artificial intelligence model, such as a GPT model. The input, or prompt, to the general artificial intelligence model would be a query as to whether a given response to an opt-out request indicates that the opt-out was successful or not. The input, or prompt, may alternatively or additionally be to classify the type of the response. In this case, the input/prompt may indicate the potential classifications, such as opt-out successful, user data successfully deleted, more user information needed, more steps needed, user data not found, etc.

As another example of performing the determination at stage 260, instead of a machine learning model (whether a specifically trained model or a general artificial intelligence model), a specific algorithm could be used to determine whether an opt-out was successful and optionally to classify the type of opt-out response. For example, for classifying opt-out responses, a keyword-based classification algorithm could use n-grams (e.g., 2-gram, 3-gram, 4-gram) of keywords and/or phrases that are known to be positive or negative responses, or certain types of responses, from a company. These n-grams of keywords may be stored in a database and associated with a corresponding type of opt-out response. For example, the 2-gram of the keywords "successfully processed" and the 3-gram of the keywords "completed your request" may indicate that the opt-out was successful. As another example, the 2-gram of the keywords "not found" may indicate that the user's data was not found, while the 2-gram of the keywords "more information" may indicate that more information is needed from the user.

However the type of opt-out is determined, in the case of a successful opt-out, the privacy application 115 may add that company to a list of successful opt-outs that may be displayed to the user on the user interface of the user device 110. In the case that more information/steps are necessary to complete the opt-out, at stage 270, the privacy application 115 may determine what the information/steps are (e.g., using machine learning and/or natural language parsing) and perform them if possible. If not, the privacy application 115 notifies the user that there is additional information or additional steps needed to complete the opt-out. The user may then perform those steps or provide that information manually.

More specifically, at stages 260 and optionally 270, in the case of a successful opt-out response (e.g., user data deleted, company will not share user data, etc.), as determined at stage 260, the privacy application 115 will mark the opt-out request as complete. In the case that more information is needed or more steps are necessary, as determined at stage 260, the privacy application 115 may notify the user to enable the user to complete the opt-out process. If the opt-out response indicates that the user needs to fill out a form, again as determined at stage 260, the privacy application 115 may be able to fill out the form for the user. In some cases, the determination at stage 260 may determine that the type of opt-out response is that the user's data was not found and therefore cannot be deleted. In that case, the privacy application 115 may mark the opt-out as complete and/or notify the user.

Note that a user may have multiple email accounts. As such, the procedure illustrated in FIG. 2 may be repeated for as many different email accounts the user wishes to process.

Figure 3:
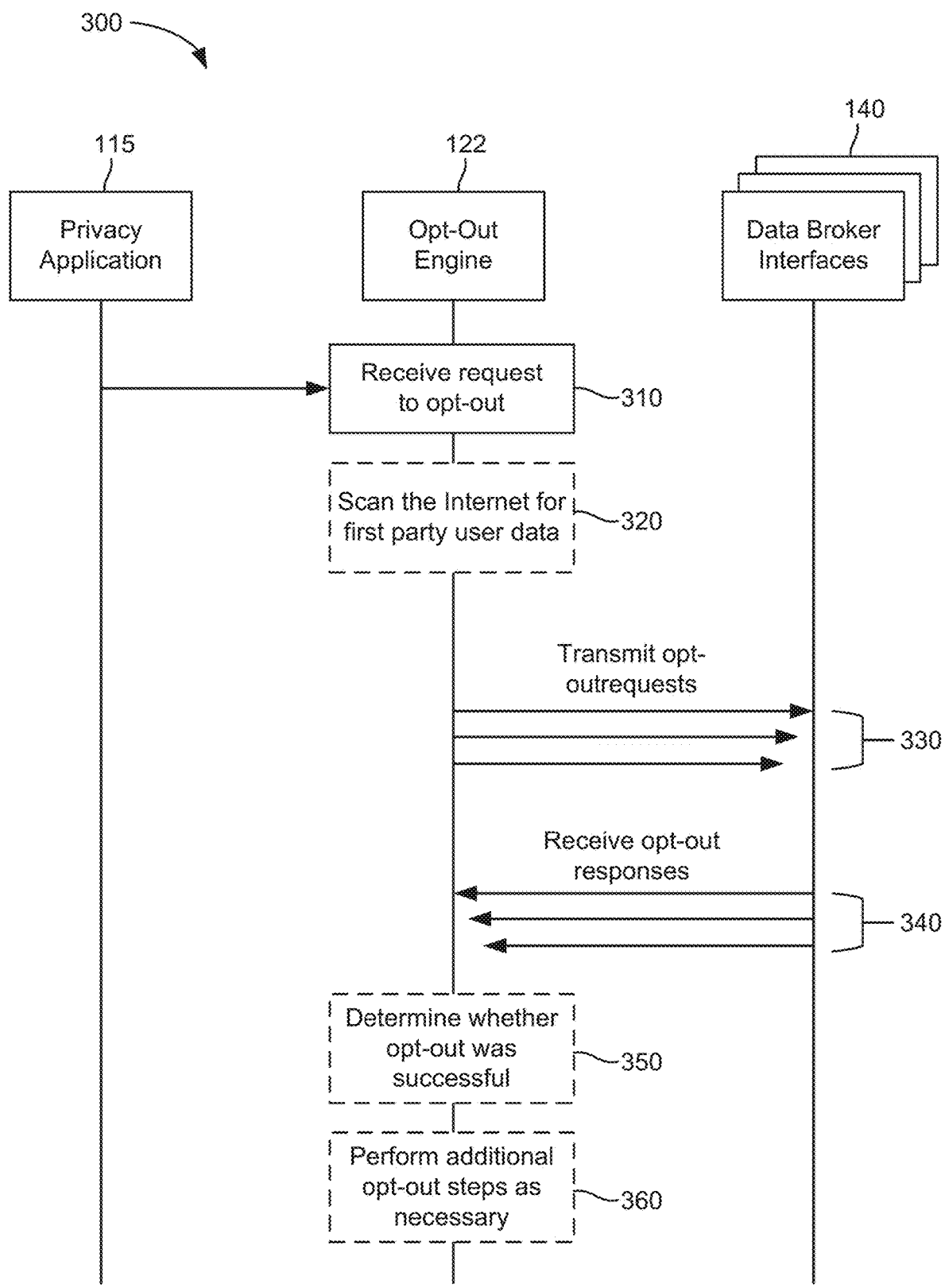
FIG. 3 illustrates an example signaling flow for the opt-out techniques related to data brokers described herein.

The techniques of the present disclosure related to the personal information stored and shared by data brokers will be described with reference to FIGS. 1 and 3. Specifically, as described above, FIG. 1 illustrates an example system 100 for implementing the opt-out techniques described herein. FIG. 3 is an example signaling flow 300 illustrating the opt-out techniques related to data brokers described herein.

As shown in FIG. 1, the privacy server(s) 120 may additionally store a database of data brokers 126. The database of data brokers 126 may store information for all known data brokers, such as name, address, website, etc. Like the database of companies 124, the database of data brokers 126 may be distributed across one or more physical data repositories at one or more privacy servers 120 or remote from the privacy server(s) 120. The privacy server 120 is in communication with a plurality M of data broker interfaces 140 (illustrated as data broker interfaces 140-1 . . . 140-M) of data brokers that may store/share/exploit users' first party data. The data broker interfaces 140 may be the companies' Internet or other network interfaces (e.g., websites, web servers, etc.).

At stage 310, the opt-out engine 122 receives an opt-out request from a privacy application 115 of a user device 110 to have the respective user's first party data removed from any data brokers that may be storing and/or sharing that data.

At stage 320, the opt-out engine 122 optionally performs a scan of the Internet for the user's first party data. For example, the opt-out engine 122 may query the data broker interfaces 140 of the data brokers stored in the database of data brokers 126 to determine if the respective data broker is storing the user's data. This stage is optional because the opt-out engine 122 may have previously performed this stage, for example, as part of a promotional offer, or because the opt-out engine 122 may send opt-out requests for the user to all data brokers stored in the database of data brokers 126, regardless of whether it has been determined that a given data broker stores the user's data.

In some cases (not shown), the opt-out engine 122 may provide the results of the scan to the privacy application 115. The results may be a total number of data brokers determined to be storing the user's first party data. The results may also list the specific data brokers found to be storing the user's data.

At stage 330, the opt-out engine 122 transmits opt-out requests to at least the data brokers determined at stage 320. Alternatively, as noted above, the opt-out engine 122 may send opt-out requests to all data brokers stored in the database of data brokers 126. As with direct companies, some data brokers may handle opt-out requests by email (i.e., a user is expected to compose and send an opt-out request to the company by email) and other data brokers may handle opt-out requests by webform (i.e., the user is expected to fill out an online form requesting the opt-out). Accordingly, for email-based opt-out requests, the opt-out engine 122 composes and sends emails requesting the types of opt-outs for the respective data brokers. For webform-based opt-outs, the opt-out engine 122 fills out and submits the applicable webform using any user data required by the webform (e.g., name, address, email, etc. of the user).

At stage 340, the opt-out engine 122 receives responses to the opt-out requests sent at stage 330. The responses may be received immediately on submission of the opt-out request (which may occur in the case of a webform request) or at some later time (e.g., after the data broker has manually processed the opt-out request email or webform). The responses may indicate that the opt-out was successful (e.g., the data broker deleted and/or will not share/sell the user's personal information), that additional information or steps are necessary, that the user's data was not found (and therefore cannot be deleted), etc. If an opt-out response is not received immediately, the response will likely be received as an email at some later time.

At stage 350, similar to stage 260, based on the responses from the data brokers received at stage 340, the opt-out engine 122 determines whether the respective opt-out requests were successful or if more information/steps are needed. As at stage 260, the opt-out engine 122 may use machine learning techniques, rule-based techniques, or the like to make this determination.

However the type of opt-out response is determined, in the case of a successful opt-out, the opt-out engine 122 may add that data broker to a list of successful opt-outs that may be displayed to the user on the user interface of the user device 110 (not shown). In the case that more information/steps are necessary to complete the opt-out, at stage 360, as at stage 270, the opt-out engine 122 may determine what the information/steps are (e.g., using machine learning and/or natural language parsing) and perform them if possible. If not, the opt-out engine 122 notifies the user (not shown) that there is additional information or additional steps needed to complete the opt-out. The user may then perform those steps or provide that information manually.

As will be appreciated, the opt-out procedures illustrated in FIGS. 2 and 3 may be performed multiple times for the same user and/or email account. For example, the opt-out procedures illustrated in FIGS. 2 and 3 may be performed periodically (e.g., weekly, monthly, annually, etc.) or on-demand (e.g., upon user request/initiation).

As will also be appreciated, while FIG. 1 illustrates one or more privacy servers 120 implementing an opt-out engine 122, the techniques described herein may be performed primarily, or entirely, by the privacy application 115 locally on the user device 110. Alternatively, the techniques described herein may be performed primarily, or entirely, by the opt-out engine 122 on the privacy server(s) 120. FIG. 2 illustrates an example of a privacy application 115 centric approach while FIG. 3 illustrates an example of an opt-out engine 122 centric approach. However, this is merely to serve as illustration, and the disclosure is not limited to these examples. For example, the opt-out engine 122 may instead perform the privacy application 115 operations illustrated in FIG. 2, such as scanning the user's email at stage 210, selecting companies at stage 230, transmitting opt-out requests and receiving responses at stages 240 and 250, determining whether the opt-outs were successful at stage 260, and performing additional opt-out steps as necessary at stage 270. Similarly, the privacy application 115 may perform the opt-out engine 122 operations illustrated in FIG. 3, such as scanning the internet for the user's data at stage 320, transmitting opt-out requests and receiving responses at stages 330 and 340, determining whether the opt-outs were successful at stage 350, and performing additional opt-out steps as necessary at stage 360. In some cases, where the primary functionality described with reference to FIGS. 2 and 3 is performed by the privacy application 115, the privacy application 115 may include the functionality of the opt-out engine 122.

In some cases, the privacy application 115 may not be necessary at all, and the user may access the opt-out engine 122 via an web interface rather than the privacy application 115. In this case, the opt-out engine 122 would perform the operations illustrated in FIG. 2 and interact with the user of the user device 110 as needed (e.g., at stages 220 and 230) via the web interface (e.g., an online webform). Similarly, with reference to FIG. 3, the opt-out engine 122 may receive the request to opt-out via a web interface rather than the privacy application 115.

In some cases, the opt-out procedures illustrated in FIGS. 2 and 3 may be provided and performed by different vendors. For example, a first vendor may provide and perform the opt-out procedure illustrated in FIG. 2 and a second vendor may provide and perform the opt-out procedure illustrated in FIG. 3. In this case, the first vendor may request the second vendor to perform the opt-out procedure illustrated in FIG. 3 for a user subscribed to the first vendor. Likewise, the second vendor may request the first vendor to perform the opt-out procedure illustrated in FIG. 2 for a user subscribed to the second vendor. As another alternative, a third vendor may request the first vendor and the second vendor to perform the opt-out procedures illustrated in FIGS. 2 and 3, respectively, for a user subscribed to the third vendor. In these cases, the database of companies 124 and the database of data brokers 126 may belong to the first and second vendors, respectively. In addition, one or more privacy servers 120, including an opt-out engine 122, would belong to the first vendor and one or more privacy servers 120, including an opt-out engine 122, would belong to the second vendor. A third vendor may also have one or more privacy servers 120 that may include an opt-out engine 122 that sends requests to the first and second vendors.

For users that have begun opting-out of having their personal information exposed online (e.g., using the procedures illustrated in FIGS. 2 and 3), it would be beneficial for those users to be provided with an indicator or rating indicating the users' current level of data exposure online. With such information, a user could take appropriate action, such as sending additional opt-out requests, applying credit freezes to their credit accounts, and the like. Additionally, tracking the increase or decrease of a user's exposure rating enables the user to easily understand how well they are doing at eliminating these data vulnerabilities. The exposure rating may also provide a critical component of various cybersecurity technologies, fraud detection, and risk algorithms. For example, third party risk technologies that assess an organization's data breach risk from third party vendors could use the exposure ratings of the users within that organization to assess and provide an organizational risk reporting and remediation. As another example, financial institutions that monitor their customers' transactions for fraud could incorporate the exposure rating as an early warning detection of likely risk of a user being targeted for fraud. As yet another example, insurance companies' risk algorithms could use the exposure rating in determining insurance rates and risks of a user. As still another example, antivirus technology and algorithms could use the exposure rating to alert users of potential cybersecurity risks. As a further example, the military and/or government could use the exposure rating in their cyber defense technology to better prevent cyberterrorism and cyberwarfare from personal data exposures.

Accordingly, the present disclosure provides techniques for determining a numerical exposure rating that indicates the extent to which a user has minimized the exposure of their personal information online. The exposure rating may thereby indicate a user's vulnerability to scams, hacking, identity theft, and spam. The exposure rating may be determined based on the results of the opt-out procedures illustrated in FIGS. 2 and 3 and may change over time (either increase or decrease) based on user actions. For example, performing only one of the opt-out procedures illustrated in FIGS. 2 and 3 may result in a base exposure rating, and performing the other opt-out procedure may increase that rating. Similarly, as opt-outs are completed for additional companies and/or data brokers, the rating may increase.

Figure 4:
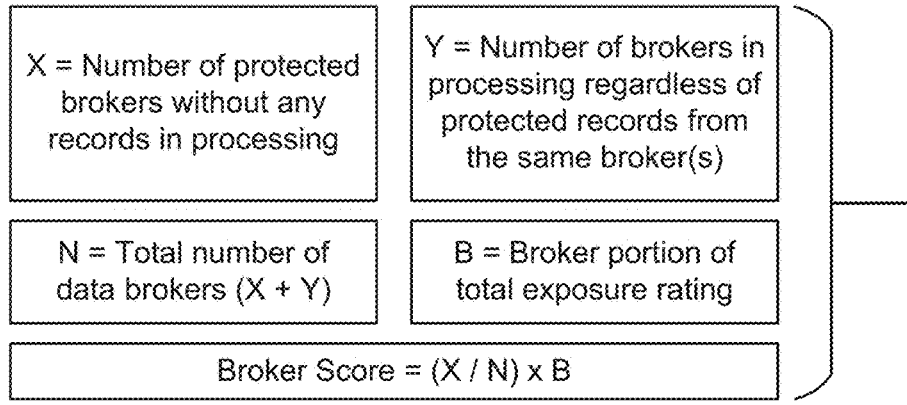
FIG. 4 is a diagram illustrating an example of how a user's exposure rating is calculated, according to one or more aspects of the disclosure.
Figure 4:
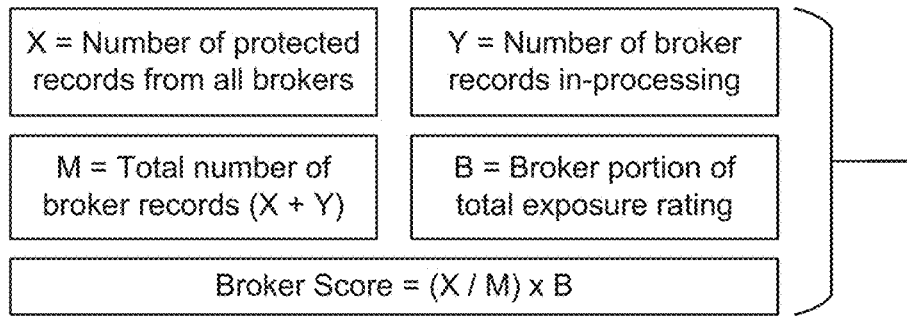
Figure 4:
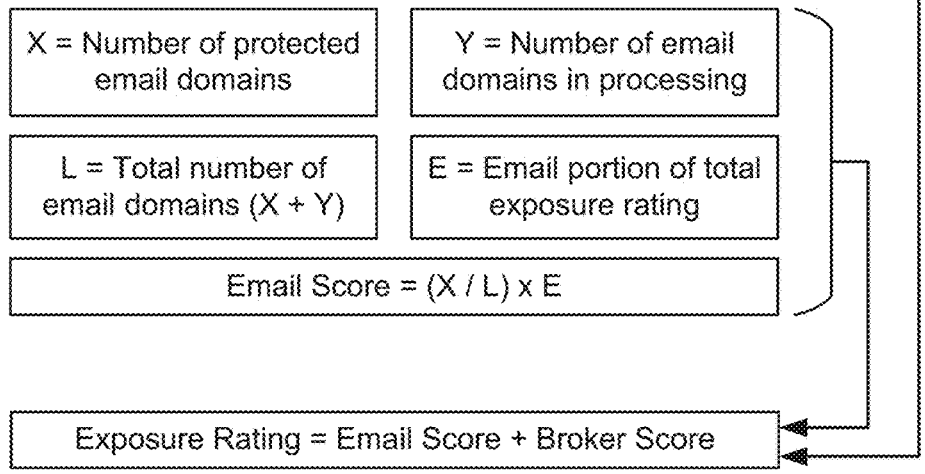

FIG. 4 is a diagram 400 illustrating an example of how a user's exposure rating may be calculated, according to one or more aspects of the disclosure. In an aspect, the privacy application 115 or the opt-out engine 122 may calculate the exposure rating. As shown in FIG. 4, the exposure rating is based on a broker score and an email score. The email score may be obtained based on performance of the opt-out procedure illustrated in FIG. 2 and the broker score may be obtained based on performance of the opt-out procedure illustrated in FIG. 3. In the example of FIG. 4, there may be two options for determining the broker score.

A first alternative for determining the broker score is to base the broker score on the number of brokers for which no record associated with the user has been found during the most recently performed opt-out procedure of FIG. 3 (e.g., during the scan at stage 320). Such data brokers are referred to as "protected data brokers" (or simply "protected brokers") and include data brokers from which the user has successfully opted-out and data brokers that were never found to store records for the user. For example, an initial scan (e.g., as at stage 320) may find that 50 of 92 data brokers are storing (and therefore likely exploiting) the user's personal data. As such, there are 42 protected data brokers after this initial scan, even before any opt-out requests have been sent, because there are 42 (92 minus 50) data brokers that were found to not be storing records associated with the user. Upon successfully opting-out from 34 data brokers, for example, of the initial 50 data brokers, the number of protected brokers would increase to 76 (42 plus 34). In a subsequent data broker opt-out procedure, 76 data brokers should be found to not store any personal data of the user.

In some cases, a data broker may have multiple records corresponding to the same user. For example, there may be different variations of the user's name (e.g., with or without middle name or middle initial), different variations of the user's address, and/or the like, and a data broker may have different records for each variation. Alternatively, or additionally, the data broker may have a different record for the user's name and address, name and email, name and phone number, and/or the like. In such cases, the opt-out procedure illustrated in FIG. 3 may need to send opt-out requests for each record associated with the user. In this case, a protected data broker is a data broker that has no records associated with the user.

Thus, in the first alternative, the privacy application 115 or the opt-out engine 122 determines the total number of protected data brokers (denoted "X") and the number of data brokers that are still processing opt-out requests for the user (denoted "Y"). The sum of these values should equal the total number of data brokers stored in the database of data brokers 126 (denoted "N"). The data broker portion of the exposure rating is then calculated as (X/N)*B, where B is the portion of the exposure rating attributable to the data broker score.

In the second alternative, the privacy application 115 or the opt-out engine 122 determines the total number of protected records across all brokers (denoted "X") and the number of records across all data brokers for which an opt-out request is still being processed (denoted "Y"). "Protected" records are user records that have been found via the opt-out procedure of FIG. 3 (e.g., the scan at stage 320) and successfully opted-out (e.g., removed/deleted) by the respective data broker(s) in response to opt-out requests(s) (e.g., at stage 330). Protected records may also include successful verifications that the user's personal data was not found for a given data broker. The sum of these values (i.e., X and Y) should equal the total number of user records found across all data brokers (denoted "M") stored in the database of data brokers 126. The data broker portion of the exposure rating is then calculated as (X/M)*B, where B is the portion of the exposure rating attributable to the data broker score.

In some cases, instead of using the calculation described above, the broker score may be calculated as follows. The total points for the broker score (B in the above calculation) may be denoted as "tp." The number of data brokers for which no user record was found, referred to as "not found brokers," may be denoted as "nfb." The number of protected records may be denoted as "pr." The total number of records across all brokers (M in the above calculation) may be denoted as "tr." The broker score may then be calculated as ((nfb+pr)/(nfb+tr))*tp. For example, for an initial scan where nfb=42, pr=0, tr=50, and tp=275, the broker score may be calculated as ((42+0)/(42+50)*275=125.54.

Referring now to the email score, the privacy application 115 or the opt-out engine 122 determines the total number of protected email domains (denoted "X") and the number of email domains for which an opt-out request is still being processed (denoted "Y"). "Protected" email domains are commercial email domains that were found via the opt-out procedure of FIG. 2 (e.g., during the scan at stage 210) and from which the user has successfully opted-out. The sum of these values (i.e., X and Y) should equal the total number of commercial email domains (denoted "L") found in the user's email account (e.g., as at stage 210) or selected for opt-out (e.g., as at stage 230). The email portion of the exposure rating is then calculated as (X/L)*E, where E is the portion of the exposure rating attributable to the email score.

In some cases, instead of using the calculation described above, the email score may be calculated as follows. The total number of vulnerabilities (L in the above calculation) may be denoted as "ev." This value may have an upper bound, such that the a user may have a value of ev that is less than or equal to this upper bound. The total number of vulnerabilities, regardless of an upper bound on ev, may be denoted as "tv." The variable tv may be greater than or equal to ev. That is, where tv is less than or equal to the upper bound on ev, tv may be equal to ev. However, where tv is greater than the upper bound on ev, tv will be greater than ev. The upper bound on ev, which is a maximum number of vulnerabilities, may be denoted as "mv." The number of secured vulnerabilities (X in the above calculation) may be denoted as "sv." The total points for the email score (E in the above calculation) may be denoted as "maxScore." The email score may then be calculated as ((1−ev/mv)+((ev/mv)(sv/tv)))*maxScore. For example, for a scan where ev=50, mv=750, sv=10, tv=50, and maxScore=275, the email score may be calculated as ((1−50/750)+((50/750)(10/50)))*275=260.33.

Referring back to the first email score calculation, in some cases, the value of L may have an upper limit, regardless of the number of commercial domains found/selected for opt-out. This upper limit may be determined based on crowd sourced data from some set of users. For example, based on the crowd sourced data, a maximum number of email exposures/vulnerabilities (e.g., commercial email domains from which a user wishes to opt-out) may be determined across the email accounts of all of the users. That is, based on email scans of email accounts of the set of users and their selections of email domains from which to opt-out, a maximum number of commercial domains that represent data exposures may be determined. This maximum may then be used as the upper limit, or the upper limit may be based on that average (e.g., the upper limit may be 100 email domains more than the maximum).

Similarly, an average number of data exposures/vulnerabilities may be determined across the email accounts of all of the users. The email score of a given user can then be compared to the average of all users. In this case, a number of email exposures less than the average may result in a higher email score, whereas a number of email exposures greater than the average may result in a lower email score. For example, a particular user's email score may be weighted based on whether the number of email exposures is more or less than the average.

In some cases, the exposure rating may have a lower bound (e.g., a minimum rating) and an upper bound (e.g., a maximum rating). For example, the maximum exposure rating may be 850 and the minimum exposure rating may be 300. A user's exposure rating may therefore fall within a range between the lower bound (e.g., 300) and the upper bound (e.g., 850), and the broker score may account for half that range (e.g., half of 550, or 275) and the email score may account for the other half of that range.

The following are examples of determining the broker score and email score based on an exposure rating that may be between 300 and 850 points. As a specific example of the first alternative for determining the broker score, it is assumed that there are 92 data brokers (N), and records associated with the user were found at 50 data brokers. In this case, as in the example above, there are currently 42 protected data brokers (X). If the data broker score accounts for half the user's exposure rating (here, half of 550 points), then the portion of the exposure rating attributable to the data broker score is 275 points (B=275). The broker score would therefore be 42 (X) divided by 92 (N) times 275, which equals 125.5 points.

As a specific example of the second alternative for determining the broker score, it is assumed that there are a total of 150 records for the user (M) across the 92 data brokers, and 120 records have been protected (i.e., were successfully opted-out) (X). As in the previous example, if the data broker score accounts for half the user's exposure rating (here, half of 550 points), then the portion of the exposure rating attributable to the data broker score is 275 points (B=275). The broker score would therefore be 120 (X) divided by 150 (M) times 275, which equals 220 points.

As a specific example of determining the email score, it is assumed that there are a total of 150 commercial email domains from which the user wishes to opt-out (L), and 120 email domains have been protected (i.e., were successfully opted-out) (X). If the email score accounts for half the user's exposure rating (here, half of 550 points), then the portion of the exposure rating attributable to the email score is 275 points (E=275). The email score would therefore be 120 (X) divided by 150 (L) times 275, which equals 220 points.

Thus, with reference to the foregoing examples, where the first alternative is used to determine the data broker score, the user's exposure rating would be 300 (the minimum exposure rating) plus 125.5 (the data broker score) plus 220 (the email score) for a total exposure rating of 675.5. Where the second alternative is used to determine the data broker score, the user's exposure rating would be 300 (the minimum exposure rating) plus 220 (the data broker score) plus 220 (the email score) for a total exposure rating of 740.

In some cases, in addition to a numeric exposure rating, the privacy application 115 or the opt-out engine 122 may provide a textual exposure rating, such as POOR, FAIR, GOOD, or EXCELLENT. The textual exposure rating may be based on the numerical exposure rating. For example, a numerical exposure rating of 300 points may correspond to a textual exposure rating of POOR, a numerical exposure rating around 500 points may correspond to a textual exposure rating of FAIR, a numerical exposure rating around 600 points may correspond to a textual exposure rating of GOOD, and a numerical exposure rating around 800 points may correspond to a textual exposure rating of EXCELLENT.

For example, when a new user signs up for the exposure rating, the user's initial exposure rating may be set to 300 points (POOR). When the user performs a broker scan (e.g., as at stage 320), the exposure rating may increase to a value around 500 (FAIR). When the user enrolls and starts successfully opting-out from the data brokers, the user's exposure rating may increase to around 600 (GOOD). When the user performs an email scan (FIG. 2), the user's exposure rating may increase to around 800 (EXCELLENT). Thus, opting-out of personal data exposures and removing unnecessary information from both direct companies and data brokers elevates a user's score, signifying improved privacy and security.

Figure 5:
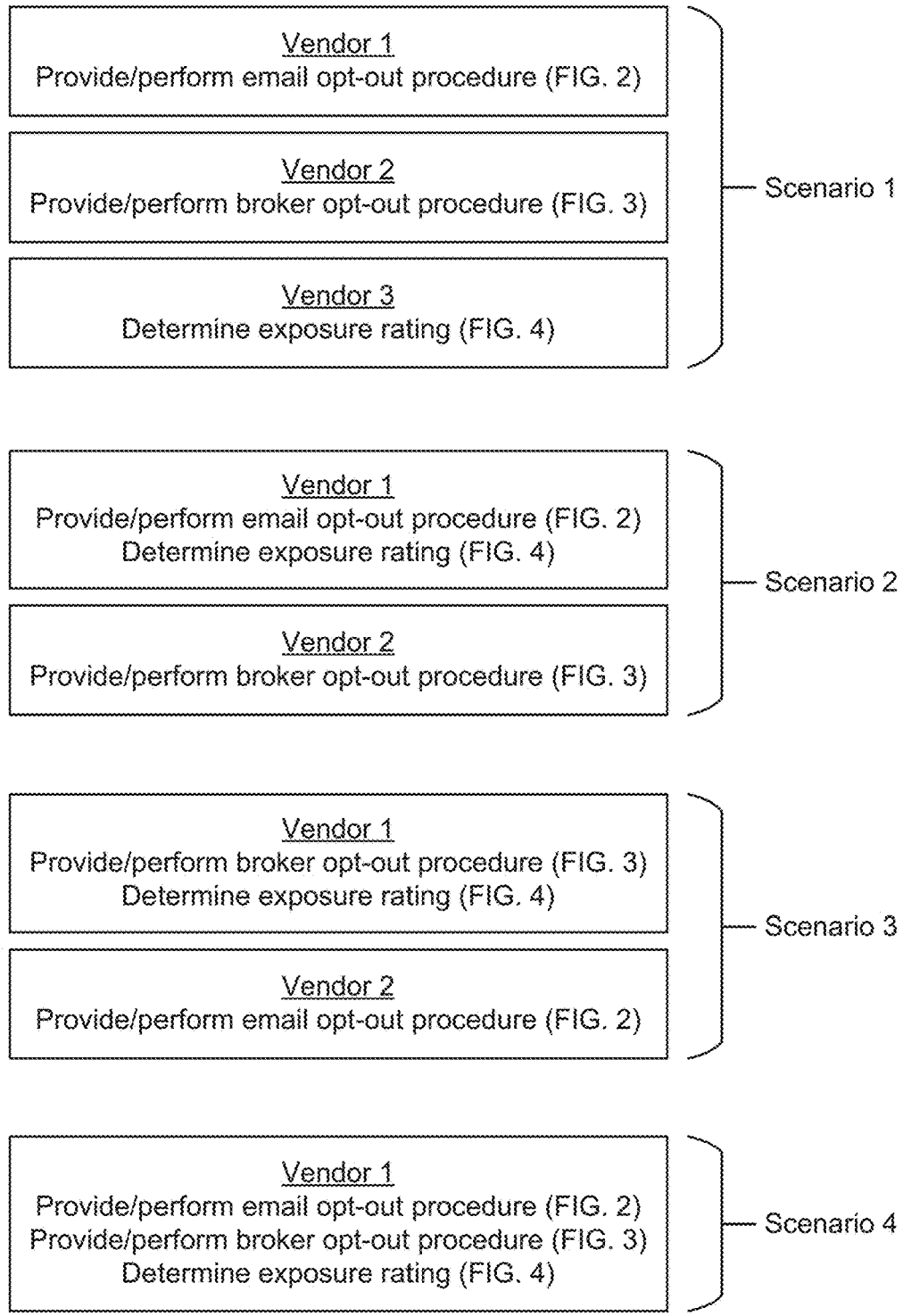
FIG. 5 is a diagram illustrating different scenarios regarding which vendor(s) may provide the email opt-out procedure, the data broker opt-out procedure, and the exposure rating, according to aspects of the disclosure.

As noted above, different vendors may provide/perform the different opt-out procedures illustrated in FIGS. 2 and 3. In some cases, yet another vendor may determine a user's exposure rating. In this case, the vendor providing the exposure rating may request the email opt-out procedure (FIG. 2) and the data broker opt-out procedure (FIG. 3) from the respective vendor(s). Alternatively, the vendor providing/performing the email opt-out procedure (FIG. 2) and/or the data broker opt-out procedure (FIG. 3) may also determine the exposure score. FIG. 5 is a diagram 500 illustrating different scenarios regarding which vendor(s) may provide the email opt-out procedure, the data broker opt-out procedure, and the exposure rating, according to aspects of the disclosure.

While the foregoing has described the exposure rating as being based primarily on a broker score and an email score, as will be appreciated, the exposure rating may be based on other factors as well. For example, the exposure rating may consider whether a user's personal information has been exposed on the Dark Web, exposed on one or more social media platforms, whether the user is already a victim of identity theft or other data harvesting, and/or the like. The exposure rating may additionally or alternatively be based on information gathered from the user that indicates other ways that the user's personal information might be exposed, such as financial transactions or purchases, types and numbers of devices the user uses, and/or the like. In these scenarios, rather than half the exposure rating being based on the broker score and half the exposure rating being based on the email score, different percentages of the exposure rating may be allocated to the different types of exposure (e.g., data broker exposure, email exposure, Dark Web exposure, social media exposure, etc.). In addition, the specific percentages allocated to the different types of exposures may change over time as new types of exposures are added or existing ones are removed or the weightings assigned to the exposure types change.

Further, as briefly noted above, an exposure rating can be assigned to an organization. In this case, a set of users in the organization (e.g., all members of the organization, all management level employees of the organization, the Board of Directors of the organization, etc.) may obtain individual exposure ratings (e.g., by performing the opt-out procedures illustrated in FIGS. 2 and 3). The individual exposure ratings may then be aggregated together into a single exposure rating for the organization. In some cases, the individual exposure ratings may be weighted in the aggregated exposure rating based on the respective users' position in the organization. For example, a manager's exposure rating may have a higher weighting than an intern's exposure rating.

Figure 6:
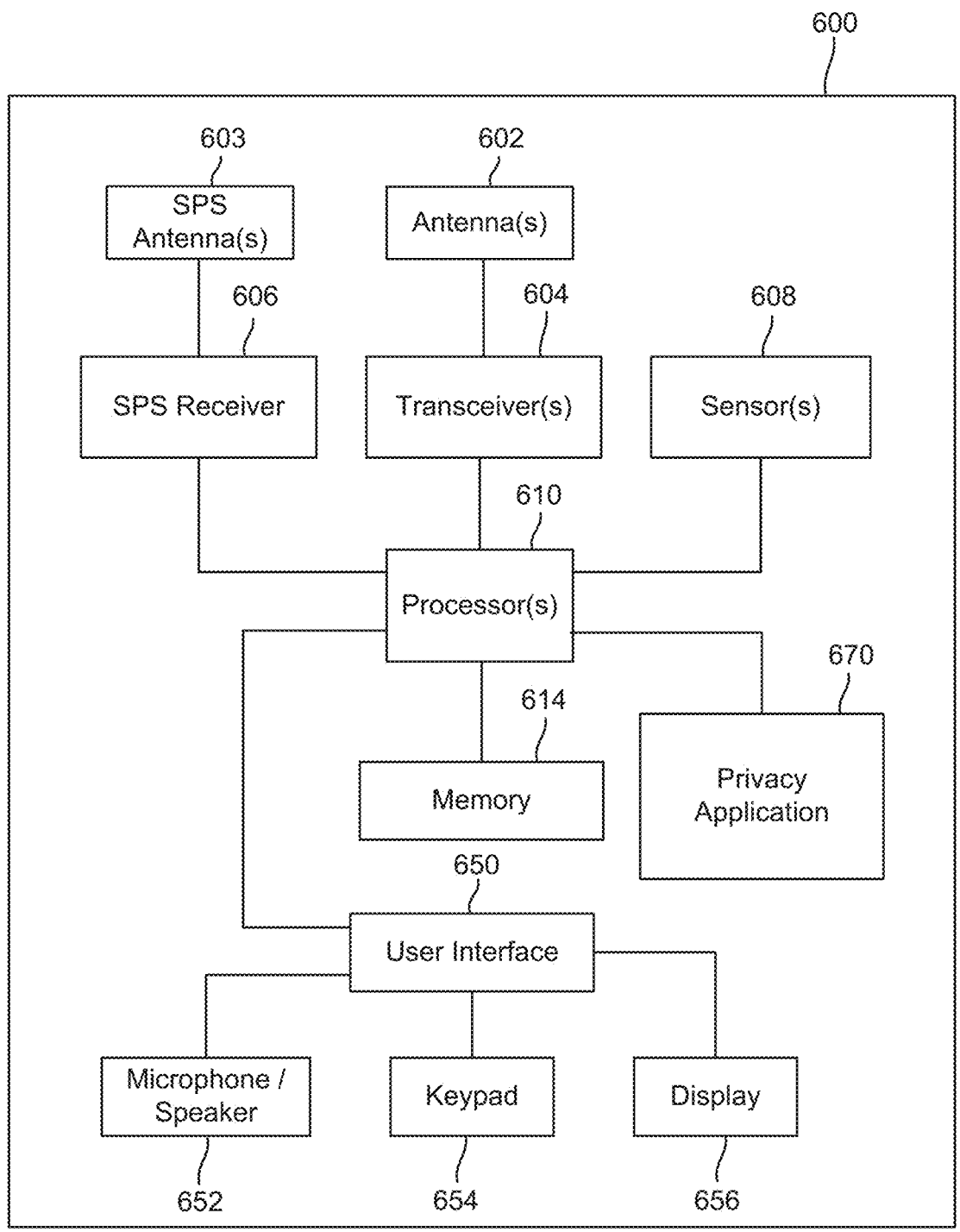
FIG. 6 is a block diagram illustrating various components of an example user device, according to aspects of the disclosure.

FIG. 6 is a block diagram illustrating various components of an example user device 600, according to aspects of the disclosure. In an aspect, the user device may correspond to any of the user devices described herein, such as user device 110 in FIG. 1. As a specific example, the user device 600 may be a smartphone, a tablet computer, a laptop computer, a desktop computer, or the like.

For the sake of simplicity, the various features and functions illustrated in the block diagram of FIG. 6 are connected together using a common data bus that is meant to represent that these various features and functions are operatively coupled together. Those skilled in the art will recognize that other connections, mechanisms, features, functions, or the like, may be provided and adapted as necessary to operatively couple and configure an actual user device. Further, it is also recognized that one or more of the features or functions illustrated in the example of FIG. 6 may be further subdivided, or two or more of the features or functions illustrated in FIG. 6 may be combined.

The user device 600 may include one or more transceivers 604 connected to one or more antennas 602 and providing means for communicating (e.g., means for transmitting, means for receiving, means for measuring, means for tuning, means for refraining from transmitting, etc.) with other network nodes, such as other user devices 110 and/or the privacy server(s) 120 via at least one designated radio access technology (RAT) (e.g., Wi-Fi, Long-Term Evolution (LTE), Fifth Generation New Radio (5G NR), etc.) over one or more wireless communication links. The one or more transceivers 604 may be variously configured for transmitting and encoding wireless signals (e.g., messages, indications, information, and so on), and, conversely, for receiving and decoding wireless signals (e.g., messages, indications, information, pilots, and so on) in accordance with the designated RAT. In an aspect, the one or more transceivers 604 and the antenna(s) 602 may form a (wireless) communication interface of the user device 600.

As used herein, a "transceiver" may include at least one transmitter and at least one receiver in an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antenna(s) 602), such as an antenna array, Similarly, a receiver may include or be coupled to a plurality of antennas (e.g., antenna(s) 602), such as an antenna array. In an aspect, the transmitter(s) and receiver(s) may share the same plurality of antennas (e.g., antenna(s) 602), such that the user device 600 can only receive or transmit at a given time, not both at the same time. In some cases, a transceiver may not provide both transmit and receive functionalities. For example, a low functionality receiver circuit may be employed in some designs to reduce costs when providing full communication is not necessary (e.g., a receiver chip or similar circuitry simply providing low-level sniffing).

The user device 600 may also include a satellite positioning system (SPS) receiver 606. The SPS receiver 606 may be connected to the one or more SPS antennas 603 and may provide means for receiving and/or measuring satellite signals. The SPS receiver 606 may comprise any suitable hardware and/or software for receiving and processing SPS signals, such as global positioning system (GPS) signals. The SPS receiver 606 requests information and operations as appropriate from the other systems, and performs the calculations necessary to determine the UE's 600 position using measurements obtained by any suitable SPS algorithm.

One or more sensors 608 may be coupled to one or more processors 610 and may provide means for sensing or detecting information related to the state and/or environment of the user device 600, such as speed, heading (e.g., compass heading), headlight status, gas mileage, etc. By way of example, the one or more sensors 608 may include a speedometer, a tachometer, an accelerometer (e.g., a microelectromechanical systems (MEMS) device), a gyroscope, a geomagnetic sensor (e.g., a compass), an altimeter (e.g., a barometric pressure altimeter), etc.

The one or more processors 610 may include one or more central processing units (CPUs), microprocessors, microcontrollers, ASICs, processing cores, DSPs, field-programmable gate arrays (FPGAs), or the like that provide processing functions, as well as other calculation and control functionality. The one or more processors 610 may therefore provide means for processing, such as means for determining, means for calculating, means for receiving, means for transmitting, means for indicating, etc. The one or more processors 610 may include any form of logic suitable for performing, or causing the components of the user device 600 to perform, at least the techniques described herein.

The one or more processors 610 may also be coupled to a memory 614 providing means for storing (including means for retrieving, means for maintaining, etc.) data and software instructions for executing programmed functionality within the user device 600. The memory 614 may be on-board the one or more processors 610 (e.g., within the same integrated circuit (IC) package), and/or the memory 614 may be external to the one or more processors 610 and functionally coupled over a data bus.

The user device 600 may include a user interface 650 that provides any suitable interface systems, such as a microphone/speaker 652, keypad 654, and display 656 that allow user interaction with the user device 600. The microphone/speaker 652 may provide for voice communication services with the user device 600. The keypad 654 may comprise any suitable buttons for user input to the user device 600. The display 656 may comprise any suitable display, such as, for example, a backlit liquid crystal display (LCD), and may further include a touch screen display for additional user input modes. The user interface 650 may therefore be a means for providing indications (e.g., audible and/or visual indications) to a user and/or for receiving user input (e.g., via user actuation of a sensing device such a keypad, a touch screen, a microphone, and so on).

In an aspect, the user device 600 may include a privacy application 670 (which may correspond to privacy application 115) coupled to the one or more processors 610. The privacy application 670 may be a hardware, software, or firmware component that, when executed, causes the user device 600 to perform the operations described herein. For example, the privacy application 670 may be a software module stored in memory 614 and executable by the one or more processors 610. As another example, the privacy application 670 may be a hardware circuit (e.g., an ASIC, a field-programmable gate array (FPGA), etc.) within the user device 600.

Figure 7:
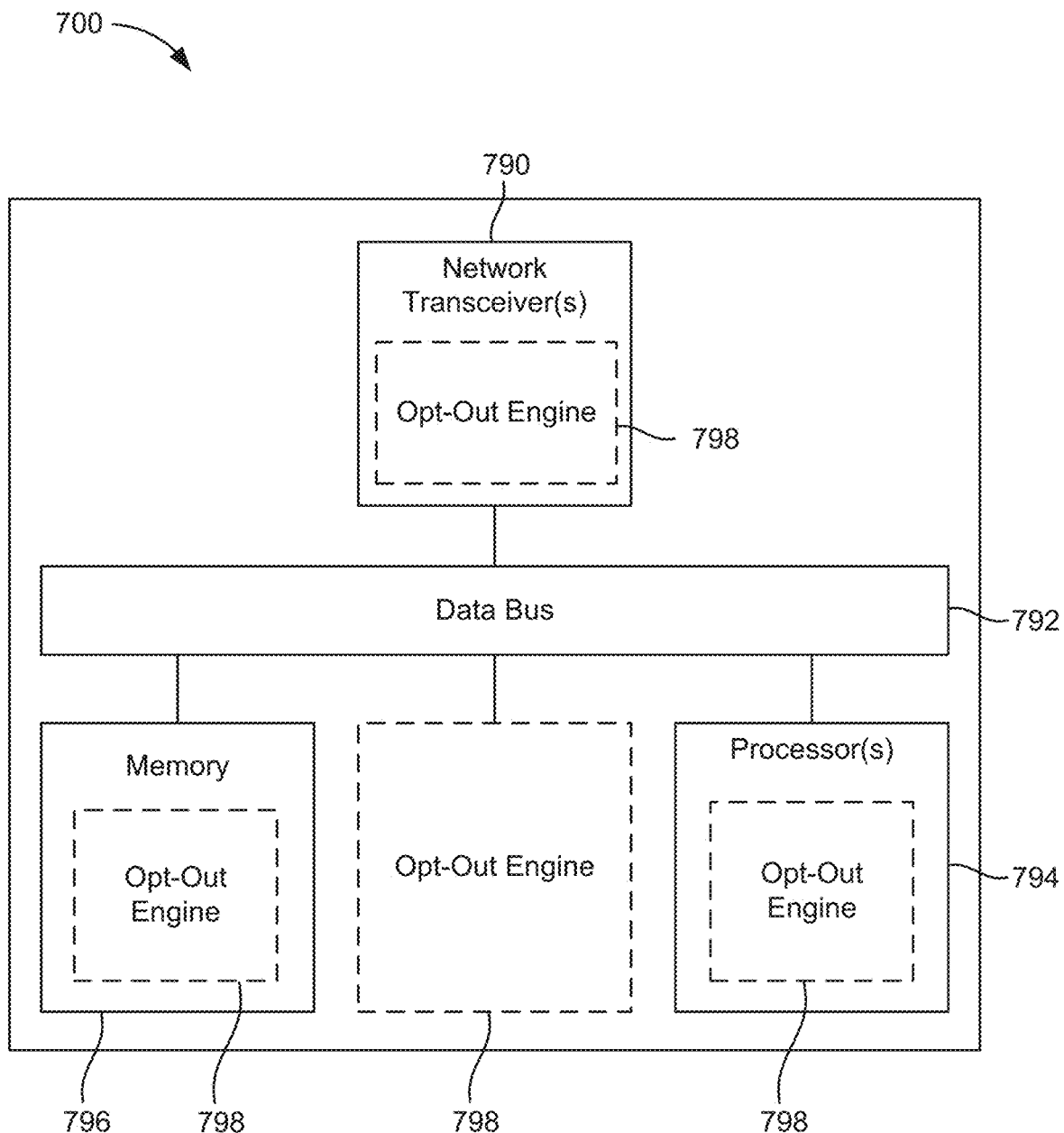
FIG. 7 is a block diagram illustrating various components of an example privacy server, according to aspects of the disclosure.

FIG. 7 illustrates several example components (represented by corresponding blocks) that may be incorporated into a privacy server 700 (which may correspond to a privacy server 120) to support the operations described herein.

The privacy server 700 may include one or more network transceivers 790 providing means for communicating (e.g., means for transmitting, means for receiving, etc.) with other network entities (e.g., other privacy servers 700/120). For example, the privacy server 700 may employ the one or more network transceivers 790 to communicate with other privacy servers 700/120 over one or more wired or wireless network interfaces.

The privacy server 700 may also include other components that may be used in conjunction with the operations as disclosed herein. The privacy server 700 may include one or more processors 794 for providing functionality relating to, for example, opt-out procedures, as described herein, and for providing other processing functionality. The one or more processors 794 may therefore provide means for processing, such as means for determining, means for calculating, means for receiving, means for transmitting, means for indicating, etc. In an aspect, the one or more processors 794 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The privacy server 700 may include memory circuitry implementing one or more memories 796 (e.g., each including a memory device) for maintaining information (e.g., the database of companies 124, the database of data brokers 126, and so on). The one or more memories 796 may therefore provide means for storing, means for retrieving, means for maintaining, etc. In some cases, the privacy server 700 may include an opt-out engine 798 (which may correspond to opt-out engine 122). The opt-out engine 798 may be hardware circuits that are part of or coupled to the one or more processors 794 that, when executed, cause the privacy server 700 to perform the functionality described herein. In other aspects, the opt-out engine 798 may be external to the one or more processors 794 (e.g., part of a modem processing system, integrated with another processing system, etc.). Alternatively, the opt-out engine 798 may be a memory module stored in the one or more memories 796 that, when executed by the one or more processors 794 (or a modem processing system, another processing system, etc.), cause the privacy server 700 to perform the functionality described herein. FIG. 7 illustrates possible locations of the opt-out engine 798, which may be, for example, part of the one or more network transceivers 790, the one or more memories 796, the one or more processors 794, or any combination thereof, or may be a standalone component.

The various components of the privacy server 700 may be communicatively coupled to each other over a data bus 792. In an aspect, the data bus 792 may form, or be part of, a communication interface of the privacy server 700. For example, where different logical entities are embodied in the same device, the data bus 792 may provide communication between them.

The components of FIG. 7 may be implemented in various ways. In some implementations, the components of FIG. 7 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 790 to 798 may be implemented by processor and memory component(s) of the privacy server 700 (e.g., by execution of appropriate code and/or by appropriate configuration of processor components). For simplicity, various operations, acts, and/or functions are described herein as being performed "by a privacy server." However, as will be appreciated, such operations, acts, and/or functions may actually be performed by specific components or combinations of components of the privacy server 700, such as the one or more processors 794, the one or more network transceivers 790, the one or more memories 796, the opt-out engine 798, etc.

Figure 8:
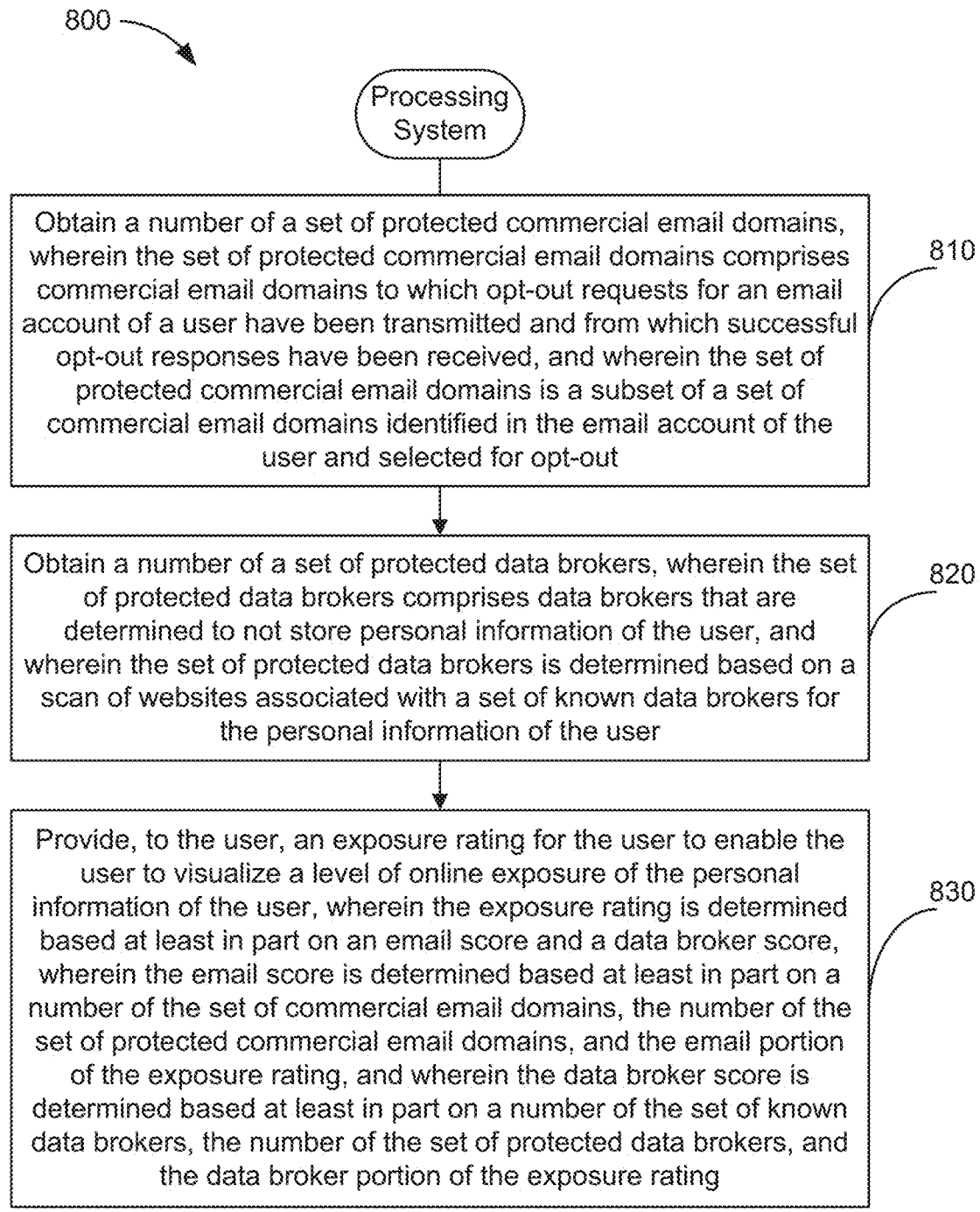
FIGS. 8 and 9 illustrate example methods, according to one or more aspects of the disclosure.

FIG. 8 illustrates an example method 800, according to one or more aspects of the disclosure. In an aspect, the method 800 may be performed by a processing system. The processing system may be a server (e.g., privacy server 120, privacy server 700) or a user device (e.g., user device 110, user device 600). Alternatively, the processing system may be the processing system of a server (e.g., the one or more processors 794, the opt-out engine 798, etc.) or a user device (e.g., the one or more processors 610, the privacy application 670, etc.).

At 810, the processing system obtains, via one or more transceivers (e.g., transceiver(s) 604, network transceiver(s) 790), a number of a set of protected commercial email domains, wherein the set of protected commercial email domains comprises commercial email domains to which opt-out requests for an email account of a user have been transmitted and from which successful opt-out responses have been received, and wherein the set of protected commercial email domains is a subset of a set of commercial email domains identified in the email account of the user and selected for opt-out.

In an aspect, where the processing system is a user device or processing system of the user device, operation 810 may be performed by the one or more transceivers 604, the one or more processors 610, memory 614, and/or the privacy application 670, any or all of which may be considered means for performing this operation. Where the processing system is a server or a processing system of the server, operation 810 may be performed by the one or more network transceivers 790, the one or more processors 794, memory 796, and/or the opt-out engine 798, any or all of which may be considered means for performing this operation.

At 820, the processing system obtains, via the one or more transceivers, a number of a set of protected data brokers, wherein the set of protected data brokers comprises data brokers that are determined to not store personal information of the user, and wherein the set of protected data brokers is determined based on a scan of websites associated with a set of known data brokers for the personal information of the user; and In an aspect, where the processing system is a user device or processing system of the user device, operation 820 may be performed by the one or more transceivers 604, the one or more processors 610, memory 614, and/or the privacy application 670, any or all of which may be considered means for performing this operation. Where the processing system is a server or a processing system of the server, operation 820 may be performed by the one or more network transceivers 790, the one or more processors 794, memory 796, and/or the opt-out engine 798, any or all of which may be considered means for performing this operation.

At 830, the processing system provides, to the user, an exposure rating for the user to enable the user to visualize a level of online exposure of the personal information of the user, wherein the exposure rating is determined based at least in part on an email score and a data broker score, wherein the email score is determined based at least in part on a number of the set of commercial email domains, the number of the set of protected commercial email domains, and the email portion of the exposure rating, and wherein the data broker score is determined based at least in part on a number of the set of known data brokers, the number of the set of protected data brokers, and the data broker portion of the exposure rating.

In an aspect, where the processing system is a user device or processing system of the user device, operation 830 may be performed by the one or more transceivers 604, the one or more processors 610, memory 614, and/or the privacy application 670, any or all of which may be considered means for performing this operation. Where the processing system is a server or a processing system of the server, operation 830 may be performed by the one or more network transceivers 790, the one or more processors 794, memory 796, and/or the opt-out engine 798, any or all of which may be considered means for performing this operation.

In some cases, where the processing system is or is included in a user device of the user, providing the exposure rating at operation 830 may include displaying the exposure rating on a user interface of the user device.

In some cases, where the processing system is a server or is included in a server in communication with a user device of the user, providing the exposure rating at operation 830 may include transmitting, via one or more transceivers, the exposure rating to the user device.

In some cases, the method 800 may further include (not shown) receiving, via one or more transceivers, a request from the user to opt-out the email account of the user from the set of commercial email domains identified in the email account of the user.

In some cases, the method 800 may further include (not shown) transmitting, via one or more transceivers, in response to the request from the user, a request to a second apparatus (e.g., another server, such as one belonging to Vendor 1 in Scenario 1 of FIG. 5) to opt-out the email account of the user from the set of commercial email domains identified in the email account of the user. In this case, obtaining the number of the set of protected commercial email domains at operation 810 may include receiving, via the one or more transceivers, the number of the set of protected commercial email domains from the second apparatus. Further, the method 800 may further include receiving, via the one or more transceivers, the number of the set of commercial email domains from the second apparatus.

In some cases, obtaining the number of the set of protected commercial email domains at operation 810 may include transmitting, via one or more transceivers, in response to the request from the user, opt-out requests for the email account of the user to commercial entities corresponding to the set of commercial email domains, receiving, via the one or more transceivers, the successful opt-out responses from commercial entities corresponding to the set of protected commercial email domains, and determining the number of the set of protected commercial email domains based on reception of the successful opt-out responses from the set of protected commercial email domains.

In some cases, the method 800 may further include (not shown) receiving, via one or more transceivers, a request from the user to opt-out the personal information of the user from the set of known data brokers.

In some cases, the method 800 may further include (not shown) transmitting, via one or more transceivers, in response to the request from the user, a request to a second apparatus (e.g., another server, such as one belonging to Vendor 2 in Scenario 1 of FIG. 5) to opt-out the personal information of the user from the set of known data brokers. In this case, obtaining the number of the set of protected data brokers at operation 820 may include receiving, via the one or more transceivers, the number of the set of protected data brokers from the second apparatus. Further, the method 800 may further include receiving, via the one or more transceivers, the number of the set of data brokers from the second apparatus.

In some cases, obtaining the number of the set of protected data brokers at operation 820 may include performing, via one or more transceivers, the scan of the websites associated with the set of known data brokers for the personal information of the user, and determining, based on the scan, the set of protected data brokers. In this case, the method 800 may further include (not shown) transmitting, via one or more transceivers, in response to the request from the user, opt-out requests for the personal information of the user to a first subset of the set of known data brokers other than the set of protected data brokers, wherein the first subset of the set of known data brokers is determined to store the personal information of the user based on the scan. The method 800 may further include (not shown) receiving, via the one or more transceivers, successful opt-out responses from a second subset of the set of known data brokers, wherein the second subset of the set of known data brokers is a subset of or corresponds to the first subset of the set of known data brokers. In some cases, the set of protected data brokers includes the second subset of the set of known data brokers based on the scan being performed after reception of the successful opt-out responses, or the set of protected data brokers does not include the second subset of the set of known data brokers based on the opt-out requests being transmitted after the scan.

In some cases, the exposure rating may greater than or equal to a minimum value and less than or equal to a maximum value, the email portion of the exposure rating may be a first portion of a difference between the minimum value and the maximum value, and the broker portion of the exposure rating may be a second portion of the difference between the minimum value and the maximum value. In some cases, the first portion may be half the difference between the minimum value and the maximum value, and the second portion may be half the difference between the minimum value and the maximum value.

In some cases, the email score may be determined as the number of the set of protected commercial email domains divided by the number of the set of commercial email domains multiplied by the email portion of the exposure rating, and the data broker score may be determined as the number of the set of protected data brokers divided by the number of the set of known data brokers multiplied by the data broker portion of the exposure rating.

In some cases, the exposure rating may be determined as a sum of the email score and the data broker score.

Figure 9:
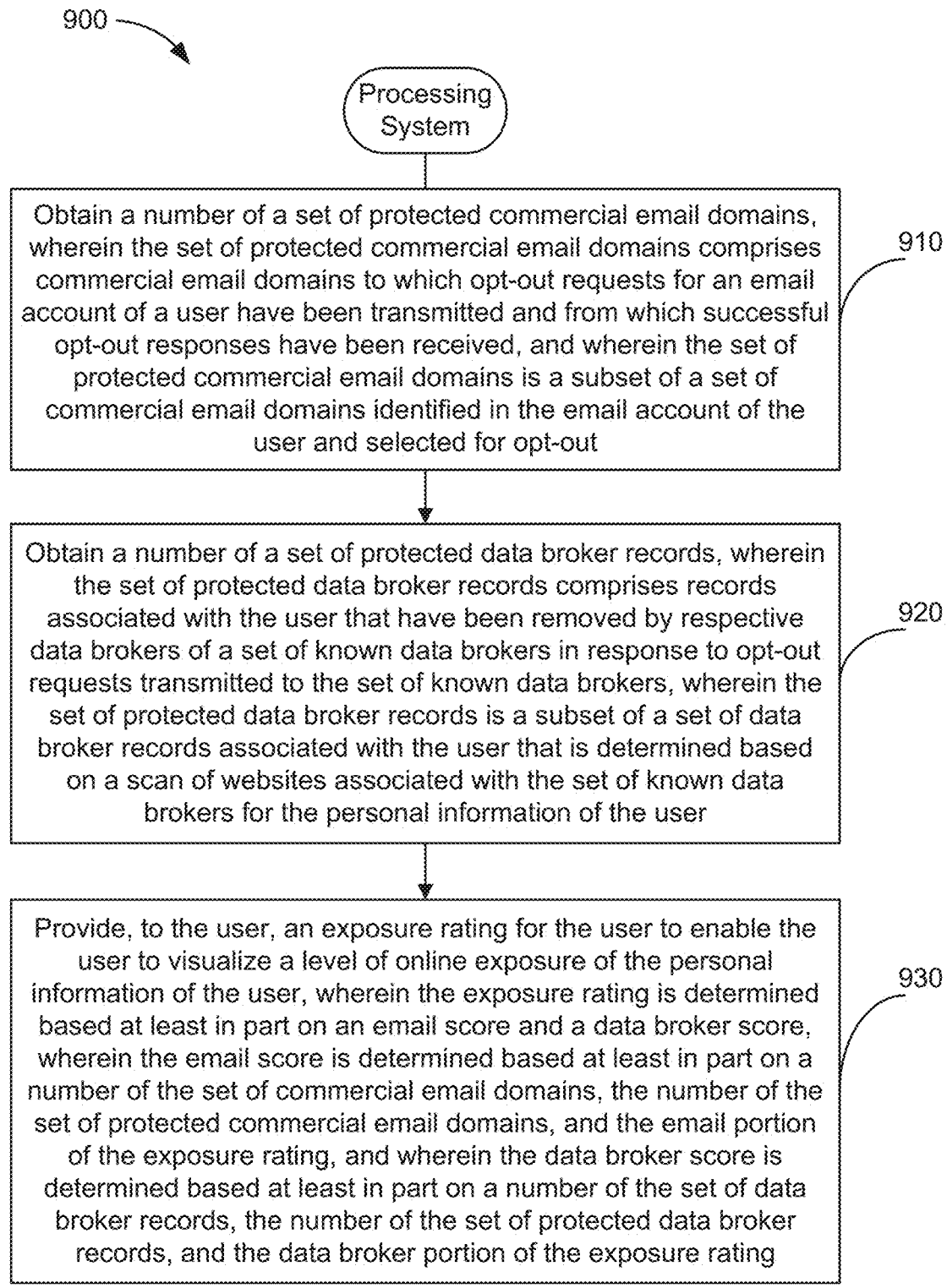

FIG. 9 illustrates an example method 900, according to one or more aspects of the disclosure. In an aspect, the method 900 may be performed by a processing system. The processing system may be a server (e.g., privacy server 120, privacy server 700) or a user device (e.g., user device 110, user device 600). Alternatively, the processing system may be the processing system of a server (e.g., the one or more processors 794, the opt-out engine 798, etc.) or a user device (e.g., the one or more processors 610, the privacy application 670, etc.).

At 910, the processing system obtains, via one or more transceivers (e.g., transceiver(s) 604, network transceiver(s) 790), a number of a set of protected commercial email domains, wherein the set of protected commercial email domains comprises commercial email domains to which opt-out requests for an email account of a user have been transmitted and from which successful opt-out responses have been received, and wherein the set of protected commercial email domains is a subset of a set of commercial email domains identified in the email account of the user and selected for opt-out.

In an aspect, where the processing system is a user device or processing system of the user device, operation 910 may be performed by the one or more transceivers 604, the one or more processors 610, memory 614, and/or the privacy application 670, any or all of which may be considered means for performing this operation. Where the processing system is a server or a processing system of the server, operation 910 may be performed by the one or more network transceivers 790, the one or more processors 794, memory 796, and/or the opt-out engine 798, any or all of which may be considered means for performing this operation.

At 920, the processing system obtains, via the one or more transceivers, a number of a set of protected data broker records, wherein the set of protected data broker records comprises records associated with the user that have been removed by respective data brokers of a set of known data brokers in response to opt-out requests transmitted to the set of known data brokers, wherein the set of protected data broker records is a subset of a set of data broker records associated with the user that is determined based on a scan of websites associated with the set of known data brokers for the personal information of the user; and In an aspect, where the processing system is a user device or processing system of the user device, operation 920 may be performed by the one or more transceivers 604, the one or more processors 610, memory 614, and/or the privacy application 670, any or all of which may be considered means for performing this operation. Where the processing system is a server or a processing system of the server, operation 920 may be performed by the one or more network transceivers 790, the one or more processors 794, memory 796, and/or the opt-out engine 798, any or all of which may be considered means for performing this operation.

At 930, the processing system provides, to the user, an exposure rating for the user to enable the user to visualize a level of online exposure of the personal information of the user, wherein the exposure rating is determined based at least in part on an email score and a data broker score, wherein the email score is determined based at least in part on a number of the set of commercial email domains, the number of the set of protected commercial email domains, and the email portion of the exposure rating, and wherein the data broker score is determined based at least in part on a number of the set of data broker records, the number of the set of protected data broker records, and the data broker portion of the exposure rating.

In an aspect, where the processing system is a user device or processing system of the user device, operation 930 may be performed by the one or more transceivers 604, the one or more processors 610, memory 614, and/or the privacy application 670, any or all of which may be considered means for performing this operation. Where the processing system is a server or a processing system of the server, operation 930 may be performed by the one or more network transceivers 790, the one or more processors 794, memory 796, and/or the opt-out engine 798, any or all of which may be considered means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user device (e.g., a smartphone). In the alternative, the processor and the storage medium may reside as discrete components in a user device.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more items and may be used interchangeably with "at least one," "one or more," and the like. Also, as used herein, the terms "has," "have," "having," and the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more items and may be used interchangeably with "at least one," "one or more," and the like. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. An apparatus, comprising:
one or more memories;
one or more transceivers; and
one or more processors communicatively coupled to the one or more memories and the one or more transceivers, the one or more processors, either alone or in combination, configured to:
obtain, via the one or more transceivers, a number of a set of protected commercial email domains, wherein the set of protected commercial email domains comprises commercial email domains to which opt-out requests for an email account of a user have been transmitted and from which successful opt-out responses have been received, and wherein the set of protected commercial email domains is a subset of a set of commercial email domains identified in the email account of the user and selected for opt-out;
obtain, via the one or more transceivers, a number of a set of protected data brokers, wherein the set of protected data brokers comprises data brokers that are determined to not store personal information of the user, and wherein the set of protected data brokers is determined based on a scan of websites associated with a set of known data brokers for the personal information of the user; and
provide, to the user, an exposure rating for the user to enable the user to visualize a level of online exposure of the personal information of the user, wherein the exposure rating is determined based at least in part on an email score and a data broker score, wherein the email score is determined based at least in part on a number of the set of commercial email domains, the number of the set of protected commercial email domains, and the email portion of the exposure rating, and wherein the data broker score is determined based at least in part on a number of the set of known data brokers, the number of the set of protected data brokers, and the data broker portion of the exposure rating.

2. The apparatus of claim 1, wherein:
the apparatus is a user device of the user, and
the one or more processors configured to provide the exposure rating comprises the one or more processors, either alone or in combination, configured to display the exposure rating on a user interface of the user device.

3. The apparatus of claim 1, wherein:
the apparatus is a server in communication with a user device of the user,
the one or more processors configured to provide the exposure rating comprises the one or more processors, either alone or in combination, configured to transmit, via the one or more transceivers, the exposure rating to the user device.

4. The apparatus of claim 1, wherein the one or more processors, either alone or in combination, are further configured to:
receive, via the one or more transceivers, a request from the user to opt-out the email account of the user from the set of commercial email domains identified in the email account of the user.

5. The apparatus of claim 4, wherein:
the one or more processors, either alone or in combination, are further configured to transmit, via the one or more transceivers, in response to the request from the user, a request to a second apparatus to opt-out the email account of the user from the set of commercial email domains identified in the email account of the user,
the one or more processors configured to obtain the number of the set of protected commercial email domains comprises the one or more processors, either alone or in combination, configured to receive, via the one or more transceivers, the number of the set of protected commercial email domains from the second apparatus, and
the one or more processors, either alone or in combination, are further configured to receive, via the one or more transceivers, the number of the set of commercial email domains from the second apparatus.

6. The apparatus of claim 4, wherein the one or more processors configured to obtain the number of the set of protected commercial email domains comprises the one or more processors, either alone or in combination, configured to:
transmit, via the one or more transceivers, in response to the request from the user, opt-out requests for the email account of the user to commercial entities corresponding to the set of commercial email domains;
receive, via the one or more transceivers, the successful opt-out responses from commercial entities corresponding to the set of protected commercial email domains; and
determine the number of the set of protected commercial email domains based on reception of the successful opt-out responses from the set of protected commercial email domains.

7. The apparatus of claim 1, wherein the one or more processors, either alone or in combination, are further configured to:
receive, via the one or more transceivers, a request from the user to opt-out the personal information of the user from the set of known data brokers.

8. The apparatus of claim 7, wherein:
the one or more processors, either alone or in combination, are further configured to transmit, via the one or more transceivers, in response to the request from the user, a request to a second apparatus to opt-out the personal information of the user from the set of known data brokers,
the one or more processors configured to obtain the number of the set of protected data brokers comprises the one or more processors, either alone or in combination, configured to receive, via the one or more transceivers, the number of the set of protected data brokers from the second apparatus, and
the one or more processors, either alone or in combination, are further configured to receive, via the one or more transceivers, the number of the set of data brokers from the second apparatus.

9. The apparatus of claim 7, wherein the one or more processors configured to obtain the number of the set of protected data brokers comprises the one or more processors, either alone or in combination, configured to:
perform, via the one or more transceivers, the scan of the websites associated with the set of known data brokers for the personal information of the user; and
determine, based on the scan, the set of protected data brokers.

10. The apparatus of claim 9, wherein the one or more processors, either alone or in combination, are further configured to:
transmit, via the one or more transceivers, in response to the request from the user, opt-out requests for the personal information of the user to a first subset of the set of known data brokers other than the set of protected data brokers, wherein the first subset of the set of known data brokers is determined to store the personal information of the user based on the scan; and
receive, via the one or more transceivers, successful opt-out responses from a second subset of the set of known data brokers, wherein the second subset of the set of known data brokers is a subset of or corresponds to the first subset of the set of known data brokers.

11. The apparatus of claim 10, wherein:
the set of protected data brokers includes the second subset of the set of known data brokers based on the scan being performed after reception of the successful opt-out responses, or
the set of protected data brokers does not include the second subset of the set of known data brokers based on the opt-out requests being transmitted after the scan.

12. The apparatus of claim 1, wherein:
the exposure rating is greater than or equal to a minimum value,
the exposure rating is less than or equal to a maximum value,
the email portion of the exposure rating is a first portion of a difference between the minimum value and the maximum value, and
the broker portion of the exposure rating is a second portion of the difference between the minimum value and the maximum value.

13. The apparatus of claim 12, wherein:
the first portion is half the difference between the minimum value and the maximum value, and
the second portion is half the difference between the minimum value and the maximum value.

14. The apparatus of claim 1, wherein:
the email score is determined as the number of the set of protected commercial email domains divided by the number of the set of commercial email domains multiplied by the email portion of the exposure rating, and
the data broker score is determined as the number of the set of protected data brokers divided by the number of the set of known data brokers multiplied by the data broker portion of the exposure rating.

15. The apparatus of claim 1, wherein the exposure rating is determined as a sum of the email score and the data broker score.

16. An apparatus, comprising:
one or more memories;
one or more transceivers; and
one or more processors communicatively coupled to the one or more memories and the one or more transceivers, the one or more processors, either alone or in combination, configured to:
obtain, via the one or more transceivers, a number of a set of protected commercial email domains, wherein the set of protected commercial email domains comprises commercial email domains to which opt-out requests for an email account of a user have been transmitted and from which successful opt-out responses have been received, and wherein the set of protected commercial email domains is a subset of a set of commercial email domains identified in the email account of the user and selected for opt-out;
obtain, via the one or more transceivers, a number of a set of protected data broker records, wherein the set of protected data broker records comprises records associated with the user that have been removed by respective data brokers of a set of known data brokers in response to opt-out requests transmitted to the set of known data brokers, wherein the set of protected data broker records is a subset of a set of data broker records associated with the user that is determined based on a scan of websites associated with the set of known data brokers for the personal information of the user; and
provide, to the user, an exposure rating for the user to enable the user to visualize a level of online exposure of the personal information of the user, wherein the exposure rating is determined based at least in part on an email score and a data broker score, wherein the email score is determined based at least in part on a number of the set of commercial email domains, the number of the set of protected commercial email domains, and the email portion of the exposure rating, and wherein the data broker score is determined based at least in part on a number of the set of data broker records, the number of the set of protected data broker records, and the data broker portion of the exposure rating.

17. The apparatus of claim 16, wherein the one or more processors, either alone or in combination, are further configured to:
receive, via the one or more transceivers, a request from the user to opt-out the personal information of the user from the set of known data brokers.

18. The apparatus of claim 17, wherein:
the one or more processors, either alone or in combination, are further configured to transmit, via the one or more transceivers, a request to a second apparatus to opt-out the personal information of the user from the set of known data brokers,
the one or more processors configured to obtain the number of the set of protected data broker records comprises the one or more processors, either alone or in combination, configured to receive, via the one or more transceivers, the number of the set of protected data broker records from the second apparatus, and
the one or more processors, either alone or in combination, are further configured to receive, via the one or more transceivers, the number of the set of data broker records from the second apparatus.

19. The apparatus of claim 17, wherein the one or more processors configured to obtain the number of the set of protected data brokers comprises the one or more processors, either alone or in combination, configured to:
perform, via the one or more transceivers, the scan of the websites associated with the set of known data brokers for the personal information of the user; and determine, based on the scan, the set of protected data broker records.

\* \* \* \* \*